(12) United States Patent
Katagiri et al.

(10) Patent No.: US 11,323,049 B2
(45) Date of Patent: May 3, 2022

(54) ROTARY ELECTRIC MACHINE, ROTARY ELECTRIC MACHINE DRIVE DEVICE, AND ROTARY ELECTRIC MACHINE DRIVE SYSTEM

(71) Applicant: Mitsubishi Electric Corporation, Tokyo (JP)

(72) Inventors: Kodai Katagiri, Tokyo (JP); Yutaro Kitagawa, Tokyo (JP); Shota Hanioka, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/294,416

(22) PCT Filed: Mar. 4, 2019

(86) PCT No.: PCT/JP2019/008276
§ 371 (c)(1),
(2) Date: May 17, 2021

(87) PCT Pub. No.: WO2020/178929
PCT Pub. Date: Sep. 10, 2020

(65) Prior Publication Data
US 2022/0021317 A1 Jan. 20, 2022

(51) Int. Cl.
*H02P 5/74* (2006.01)
*H02M 7/537* (2006.01)
H02P 27/06 (2006.01)
*H02M 1/12* (2006.01)

(52) U.S. Cl.
CPC .............. *H02P 5/74* (2013.01); *H02M 7/537* (2013.01); *H02P 27/06* (2013.01); *H02M 1/123* (2021.05)

(58) Field of Classification Search
CPC .......... H02P 5/74; H02P 27/06; H02M 7/537; H02M 1/123
See application file for complete search history.

(56) References Cited

U.S. PATENT DOCUMENTS

| 5,748,459 | A | 5/1998 | Kamada et al. |
| 9,246,737 | B2* | 1/2016 | Sorrells ................. H04L 27/00 |
| 2021/0408956 | A1* | 12/2021 | Takii ....................... H02P 5/46 |

FOREIGN PATENT DOCUMENTS

| JP | 9-117086 A | 5/1997 |
| JP | 9-233837 A | 9/1997 |
| JP | 2008-109727 A | 5/2008 |

OTHER PUBLICATIONS

International Search Report and Written Opinion dated Jun. 4, 2019, received for PCT Application PCT/JP2019/008276, Filed on Mar. 4, 2019, 6 pages including English Translation.

* cited by examiner

*Primary Examiner* — Zoheb S Imtiaz
(74) *Attorney, Agent, or Firm* — Xsensus LLP (57) ABSTRACT

A drive device includes a first inverter and a second inverter configured to respectively drive two rotary electric machines. Carrier signals for controlling the first inverter and the second inverter are set to be in mutually opposite phases. For at least one connection line out of a connection line between the first inverter and one of the rotary electric machines and a connection line between the second inverter and another one of the rotary electric machines, a balance capacitor and a balance inductor are disposed between the at least one connection line and a ground potential such that an impedance to ground generated between the one of the rotary electric machines and the ground potential coincides with an impedance to ground generated between the other one of the rotary electric machines and the ground potential.

7 Claims, 11 Drawing Sheets

ROTARY ELECTRIC MACHINE, ROTARY ELECTRIC MACHINE DRIVE DEVICE, AND ROTARY ELECTRIC MACHINE DRIVE SYSTEM

CROSS-REFERENCE TO RELATED APPLICATION

The present application is based on PCT filing PCT/JP2019/008276, filed Mar. 4, 2019, the entire contents of which are incorporated herein by reference.

TECHNICAL FIELD

The present disclosure relates to a rotary electric machine, a rotary electric machine drive device, and a rotary electric machine drive system.

BACKGROUND ART

Many rotary electric machines are driven by inverters composed of switching elements such as semiconductors. In the inverters, the switching elements generate high-frequency electromagnetic noises. The electromagnetic noises generated by the switching elements of the inverters propagate to the outside of the devices via impedances to ground generated between a ground potential and windings of the rotary electric machines connected to the inverters. Such electromagnetic noises are called common mode noises.

As a method for reducing common mode noise generated from an inverter, a method has been proposed in which, in a drive device including two inverters for driving two rotary electric machines, the two inverters are driven by using carrier signals that have equal frequencies and that are in mutually different phases. The method leads to mutual cancellation of common mode noises respectively generated by the two inverters, whereby the common mode noises are reduced. However, if the impedances to ground of the two inverters are asymmetrical with each other, a problem arises in that the cancellation effect is reduced and the common mode noises cannot be sufficiently reduced.

As a conventional drive device for solving the problem, a drive device in which capacitors for balance are disposed between a ground potential and output terminals of an inverter, has been disclosed. In the conventional drive device, the difference between capacitance components of impedances to ground of two inverters can be reduced by disposing the capacitors for balance, whereby the cancellation effect for common mode noises is prevented from being reduced (see, for example, Patent Document 1).

CITATION LIST

Patent Document

Patent Document 1: Japanese Laid-Open Patent Publication No. 2008-109727

SUMMARY OF THE INVENTION

Problems to be Solved by the Invention

The frequency of common mode noise is dependent on a drive frequency for a switching element of an inverter. Regarding the frequency dependence of common mode noise, division into a frequency region in which a capacitance component of an impedance between a ground potential and an output terminal of an inverter is dominant and a frequency region in which an inductance component of the impedance between the ground potential and the output terminal of the inverter is dominant, is made. In the conventional drive device, since the difference between the capacitance components of the impedances to ground of the two inverters is reduced, common mode noises can be reduced in a frequency region in which the capacitance components are dominant. However, in the conventional drive device, the difference between inductance components of the impedances to ground of the two inverters cannot be reduced, whereby a problem arises in that common mode noises cannot be reduced in a frequency region in which the inductance components are dominant.

The present disclosure has been made to solve the above-described problems, and an object of the present disclosure is to provide a rotary electric machine, a rotary electric machine drive device, and a rotary electric machine drive system that allow common mode noises to be reduced over a wide frequency region.

Solution to the Problems

A rotary electric machine drive device according to the present disclosure is a drive device configured to drive two rotary electric machines. The drive device includes a first inverter and a second inverter configured to respectively drive the two rotary electric machines. A carrier signal for controlling the first inverter and a carrier signal for controlling the second inverter are set to be in mutually opposite phases. For at least one inverter out of the first inverter and the second inverter, a balance capacitor and a balance inductor are disposed between an output terminal of the at least one inverter and a ground potential such that an impedance to ground generated between one of the rotary electric machines and the ground potential coincides with an impedance to ground generated between another one of the rotary electric machines and the ground potential.

A rotary electric machine drive system according to the present disclosure is a rotary electric machine drive system including: two rotary electric machines; and a drive device configured to drive the two rotary electric machines. The drive device of the rotary electric machine drive system includes a first inverter and a second inverter configured to respectively drive the two rotary electric machines. A carrier signal for controlling the first inverter and a carrier signal for controlling the second inverter are set to be in mutually opposite phases. For at least one connection line out of a connection line between the first inverter and one of the rotary electric machines and a connection line between the second inverter and another one of the rotary electric machines, a balance capacitor and a balance inductor are disposed between the at least one connection line and a ground potential such that an impedance to ground generated between the one of the rotary electric machines and the ground potential coincides with an impedance to ground generated between the other one of the rotary electric machines and the ground potential.

In a rotary electric machine according to the present disclosure, a balance capacitor and a balance inductor are disposed between an input terminal and a ground potential such that an impedance to ground generated between the input terminal and the ground potential coincides with an impedance to ground of another rotary electric machine to be driven together with the rotary electric machine.

Effect of the Invention

The rotary electric machine drive device according to the present disclosure is such that, for at least one inverter out of the first inverter and the second inverter, the balance capacitor and the balance inductor are disposed between the output terminal of the at least one inverter and the ground potential such that the impedance to ground generated between the one of the rotary electric machines and the ground potential coincides with the impedance to ground generated between the other one of the rotary electric machines and the ground potential. Thus, common mode noises can be reduced over a wide frequency region.

The rotary electric machine drive system according to the present disclosure is such that, for at least one connection line out of the connection line between the first inverter and the one of the rotary electric machines and the connection line between the second inverter and the other one of the rotary electric machines, the balance capacitor and the balance inductor are disposed between the at least one connection line and the ground potential such that the impedance to ground generated between the one of the rotary electric machines and the ground potential coincides with the impedance to ground generated between the other one of the rotary electric machines and the ground potential. Thus, common mode noises can be reduced over a wide frequency region.

The rotary electric machine according to the present disclosure is such that the balance capacitor and the balance inductor are disposed between the input terminal and the ground potential such that the impedance to ground generated between the input terminal and the ground potential coincides with the impedance to ground of the other rotary electric machine to be driven together with the rotary electric machine. Thus, common mode noises can be reduced over a wide frequency region.

DESCRIPTION OF EMBODIMENTS

Hereinafter, rotary electric machines, rotary electric machine drive devices, and rotary electric machine drive systems according to embodiments for implementing the present disclosure will be described in detail with reference to the drawings. In the drawings, the same or corresponding parts are denoted by the same reference characters.

Embodiment 1

Figure 1:
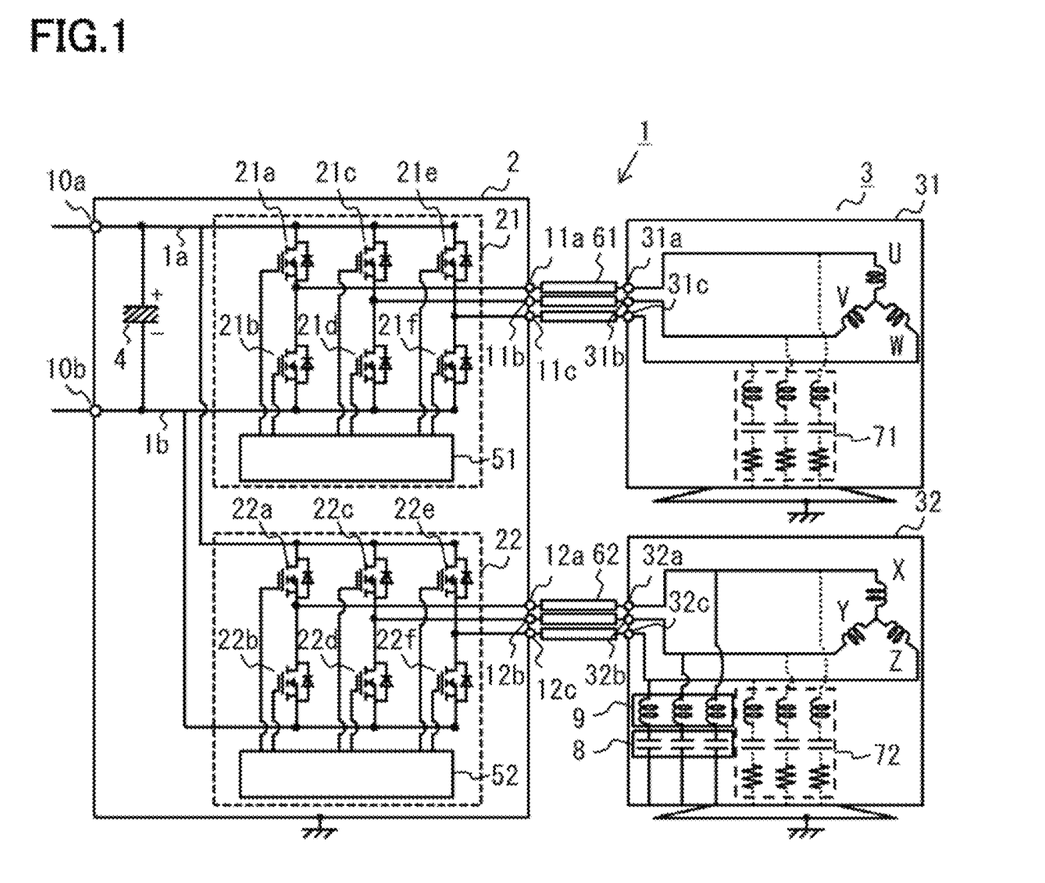
FIG. 1 is a circuit diagram of a rotary electric machine drive system according to embodiment 1.

FIG. 1 is a circuit diagram of a rotary electric machine drive system according to embodiment 1. A rotary electric machine drive system 1 according to the present embodiment includes: a drive device 2; and a rotary electric machine group 3 to be driven by the drive device. The drive device 2 includes a first inverter 21 and a second inverter 22. The rotary electric machine group 3 includes: a first rotary electric machine 31 to be driven by the first inverter 21; and a second rotary electric machine 32 to be driven by the second inverter 22. It is noted that a housing of the drive device 2, a housing of the first rotary electric machine 31, and a housing of the second rotary electric machine 32 are set to be at a ground potential.

The drive device 2 includes: a positive input terminal 10$a$ and a negative input terminal 10$b$; three output terminals 11$a$, 11$b$, and 11$c$ of the first inverter 21; and three output terminals 12$a$, 12$b$, and 12$c$ of the second inverter 22. The first rotary electric machine 31 includes three input terminals 31$a$, 31$b$, and 31$c$ connected to the three output terminals of the first inverter 21. The second rotary electric machine 32 includes three input terminals 32$a$, 32$b$, and 32$c$ connected to the three output terminals of the second inverter 22.

The drive device 2 includes: a positive electric path 1$a$ extending from the positive input terminal 10$a$; a negative electric path 1$b$ extending from the negative input terminal 10$b$; and a smoothing capacitor 4 between the positive electric path 1$a$ and the negative electric path 1$b$. The positive electric path 1$a$ and the negative electric path 1$b$ each branch into two paths at locations on the opposite side to an input terminal of the smoothing capacitor 4, and the two paths are respectively connected to input sides of the first inverter 21 and the second inverter 22.

In the first inverter 21, a series connection between a first switching element 21$a$ and a second switching element 21$b$, a series connection between a third switching element 21$c$ and a fourth switching element 21$d$, and a series connection between a fifth switching element 21$e$ and a sixth switching element 21$f$, are connected in parallel between the positive electric path 1$a$ and the negative electric path 1$b$. A midpoint of the series connection between the first switching element 21$a$ and the second switching element 21$b$ is connected to the output terminal 11$a$. A midpoint of the series connection between the third switching element 21$c$ and the fourth switching element 21$d$ is connected to the output terminal 11$b$. A midpoint of the series connection between the fifth switching element 21$e$ and the sixth switching element 21$f$ is connected to the output terminal 11$c$.

The first inverter 21 includes a control unit 51. The control unit 51 controls opening and closing timings for the six switching elements of the first inverter 21 on the basis of a voltage command and a carrier signal, to cause AC powers for three phases, i.e., a U phase, a V phase, and a W phase, to be respectively outputted from the three output terminals 11$a$, 11$b$, and 11$c$.

In the second inverter 22, a series connection between a first switching element 22$a$ and a second switching element 22$b$, a series connection between a third switching element 22$c$ and a fourth switching element 22$d$, and a series connection between a fifth switching element 22$e$ and a sixth switching element 22$f$, are connected in parallel between the positive electric path 1$a$ and the negative electric path 1$b$. A midpoint of the series connection between the first switching element 22a and the second switching element 22b is connected to the output terminal 12a. A midpoint of the series connection between the third switching element 22c and the fourth switching element 22d is connected to the output terminal 12b. A midpoint of the series connection between the fifth switching element 22e and the sixth switching element 22f is connected to the output terminal 12c.

The second inverter 22 includes a control unit 52. The control unit 52 controls opening and closing timings for the six switching elements of the second inverter 22 on the basis of a voltage command and a carrier signal, to cause AC powers for three phases, i.e., an X phase, a Y phase, and a Z phase, to be respectively outputted from the three output terminals 12a, 12b, and 12c.

As the six switching elements of the first inverter 21 and the six switching elements of the second inverter 22, for example, metal-oxide-semiconductor field-effect transistors (MOSFETs) can be used. As the switching elements, for example, insulated gate bipolar transistors (IGBTs), thyristors, and the like can also be used in addition to MOSFETs. Further, although the control unit 51 is disposed in the first inverter 21 and the control unit 52 is disposed in the second inverter 22, one control unit that is common to the first inverter 21 and the second inverter 22 may be disposed.

The three output terminals 11a, 11b, and 11c of the first inverter 21 are respectively connected to the three input terminals 31a, 31b, and 31c of the first rotary electric machine 31 by connection lines 61. The three output terminals 12a, 12b, and 12c of the second inverter 22 are respectively connected to the three input terminals 32a, 32b, and 32c of the second rotary electric machine 32 by connection lines 62.

The three input terminals 31a, 31b, and 31c of the first rotary electric machine 31 are respectively connected to a U phase winding, a V phase winding, and a W phase winding. In addition, the three input terminals 32a, 32b, and 32c of the second rotary electric machine 32 are respectively connected to an X phase winding, a Y phase winding, and a Z phase winding. The first rotary electric machine 31 has a Y connection in which the U phase winding, the V phase winding, and the W phase winding are collectively connected at a neutral point. Similarly, the second rotary electric machine 32 has a Y connection in which the X phase winding, the Y phase winding, and the Z phase winding are collectively connected at a neutral point.

An impedance to ground 71 is formed between the ground potential and the input terminals 31a, 31b, and 31c of the first rotary electric machine 31. Similarly, an impedance to ground 72 is formed between the ground potential and the input terminals 32a, 32b, and 32c of the second rotary electric machine 32. These impedances to ground refer to impedances that are inclusive of parasitic components generated between the ground potential and the input terminals. Therefore, although FIG. 1 indicates the inductance components of the impedances to ground 71 and 72 by symbols of inductors, indicates capacitance components of the impedances to ground 71 and 72 by symbols of capacitors, and indicates resistance components of the impedances to ground 71 and 72 by symbols of resistors, such elements do not actually exist.

In the rotary electric machine drive system according to the present embodiment, a balance capacitor 8 and a balance inductor 9 are further disposed between the ground potential and each of the input terminals 32a, 32b, and 32c of the second rotary electric machine 32. The balance capacitor 8 and the balance inductor 9 are disposed for adjusting the impedance to ground of the second rotary electric machine 32 such that the impedance to ground 71 of the first rotary electric machine 31 coincides with the impedance to ground 72 of the second rotary electric machine 32. More specifically, the capacitance of the balance capacitor 8 is determined such that a capacitance component of the impedance to ground 71 of the first rotary electric machine 31 coincides with a capacitance component of the impedance to ground 72 of the second rotary electric machine 32, and the inductance of the balance inductor 9 is determined such that an inductance component of the impedance to ground 71 of the first rotary electric machine 31 coincides with an inductance component of the impedance to ground 72 of the second rotary electric machine 32.

It is noted that, although description that the impedance to ground 71 of the first rotary electric machine 31 coincides with the impedance to ground 72 of the second rotary electric machine 32 has been given here, the term "coincides" is not limited to complete coincidence. The impedance to ground 71 of the first rotary electric machine 31 and the impedance to ground 72 of the second rotary electric machine 32, and a capacitance component and an inductance component of each of the balance capacitor 8 and the balance inductor 9, have frequency dependences. These frequency dependences individually differ. In addition, these frequency dependences differ depending on environmental conditions such as temperature. Thus, the capacitance component and the inductance component of the impedance to ground 71 of the first rotary electric machine 31 are difficult to be set to coincide with the capacitance component and the inductance component of the impedance to ground 72 of the second rotary electric machine 32 over a wide frequency region. Considering this, the term "coincide" mentioned here encompasses also a state where the difference between the capacitance components and the difference between the inductance components are reduced to the utmost over a wide frequency region.

Next, an operation of the rotary electric machine drive system according to the present embodiment will be described.

Figure 2:
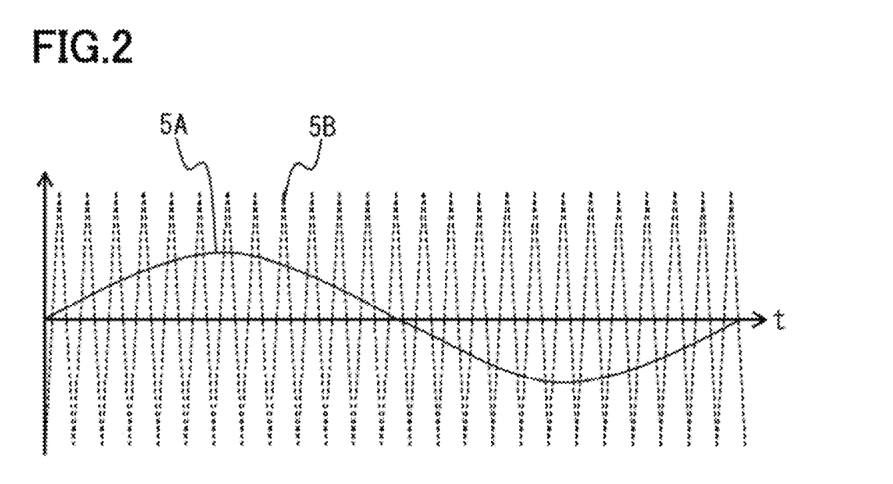
FIG. 2 is a simplified diagram of a voltage command and a carrier signal according to embodiment 1.

FIG. 2 is a simplified diagram of a voltage command and a carrier signal for generating a switching control signal of each of the control unit 51 and the control unit 52. In FIG. 2, the horizontal axis indicates time, and the vertical axis indicates signal intensity. A voltage command 5A is, for example, a sine wave. A carrier signal 5B is, for example, a triangular wave having a higher frequency than the voltage command. The control unit 51 and the control unit 52 each generate a switching control signal by high-low comparison between a voltage command and a carrier signal.

Figure 3:
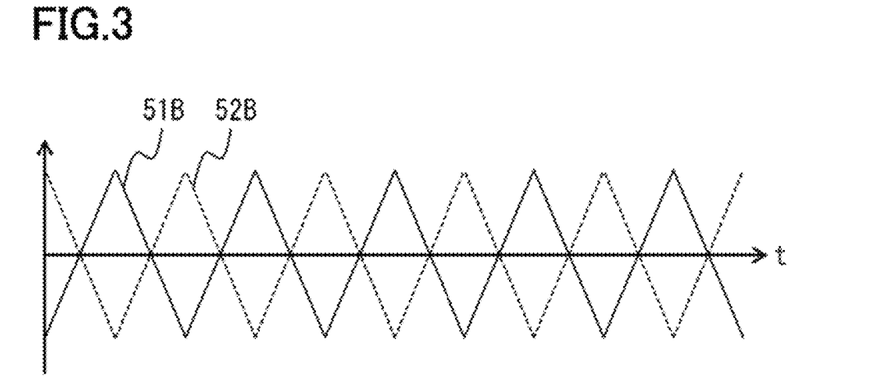
FIG. 3 is a simplified diagram of carrier signals in mutually inverse phases according to embodiment 1.

FIG. 3 is a simplified diagram of carrier signals in mutually inverse phases. In FIG. 3, the horizontal axis indicates time, and the vertical axis indicates signal intensity. As shown in FIG. 3, a carrier signal 51B for the control unit 51 of the first inverter 21 and a carrier signal 52B for the control unit 52 of the second inverter 22 have the same frequency but are in mutually inverse phases.

Common mode noise is generated owing to change in the neutral point potential of an inverter. Since the carrier signal 51B for the control unit 51 and the carrier signal 52B for the control unit 52 have the same frequency but are in mutually inverse phases, the phase of a common mode noise generated from the first inverter 21 and the phase of a common mode noise generated from the second inverter 22 are mutually inverse. Therefore, the common mode noise generated from the first inverter 21 and the common mode noise generated from the second inverter 22 mutually cancel. As a result, the common mode noises that are generated in the drive device 2 can be reduced.

However, common mode noise is known to propagate to the outside of the device via an impedance to ground of a rotary electric machine connected to an inverter. A lower impedance to ground makes it more likely for common mode noise to be diffused to the outside of the device. That is, the magnitude of the common mode noise to be diffused to the outside of the device is dependent on the impedance to ground. Therefore, the difference between the impedance to ground 71 of the first inverter 21 and the impedance to ground 72 of the second inverter 22 needs to be reduced to the utmost in order to cause the common mode noise generated from the first inverter 21 and the common mode noise generated from the second inverter 22 to mutually cancel.

In the rotary electric machine drive system according to the present embodiment, the impedance to ground 71 of the first rotary electric machine 31 coincides with the impedance to ground 72 of the second rotary electric machine 32 by the balance capacitor 8 and the balance inductor 9. Thus, diffusion of common mode noises to outside can be suppressed.

Figure 4:
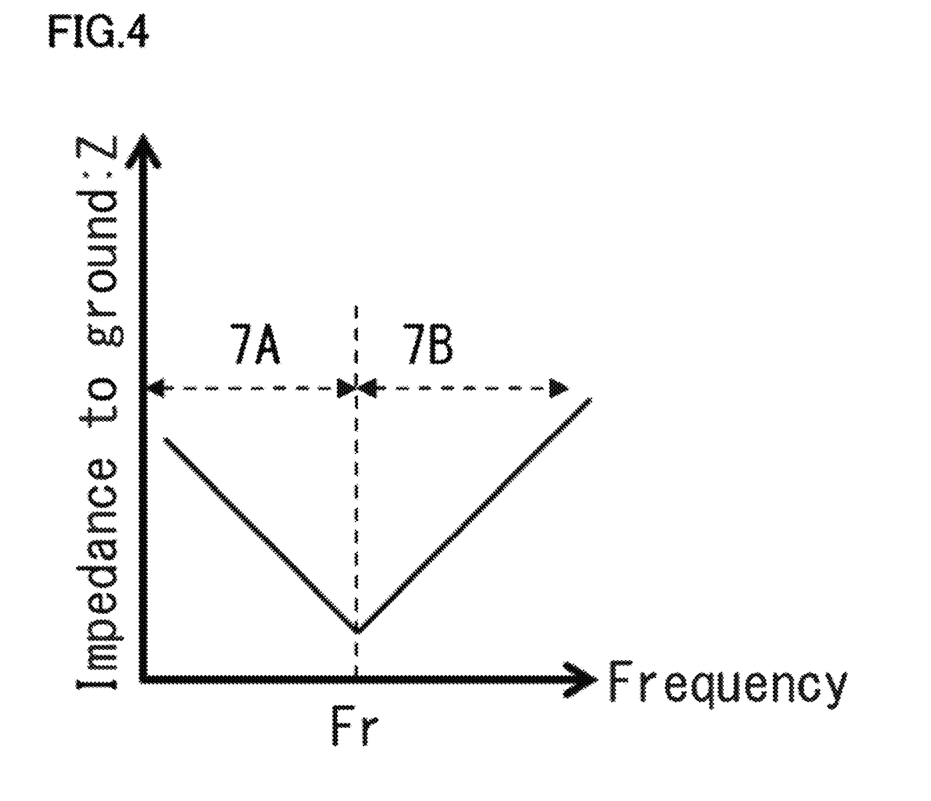
FIG. 4 is a simplified diagram of an impedance to ground of a generally used rotary electric machine.

FIG. 4 shows, in a simplified manner, the frequency dependence of an impedance to ground of a generally used rotary electric machine. In FIG. 4, the horizontal axis indicates frequency, and the vertical axis indicates impedance (Z). As shown in FIG. 4, for the impedance to ground, there are: a frequency region 7A in which a capacitance component is dominant; and a frequency region 7B in which an inductance component is dominant. These regions are separated from each other at a resonance frequency. The resonance frequency (Fr) is dependent on the structure and the size of the rotary electric machine and the like and is, in general, takes a value of several MHz. Here, the frequency is represented by "f", and the capacitance component, the inductance component, and the resistance component of the impedance to ground are respectively represented by "C", "L", and "R".

The impedance Z in the frequency region 7A in which the capacitance component is dominant is as follows.

$$Z \approx 1/(2\pi f C)$$

The impedance Z in the frequency region 7B in which the inductance component is dominant is as follows.

$$Z \approx 2\pi f L$$

The resonance frequency Fr is as follows.

$$Fr = 1/\{2\pi \sqrt{(LC)}\}$$

The impedance Z at the resonance frequency is as follows.

$$Z = R$$

Figure 5:
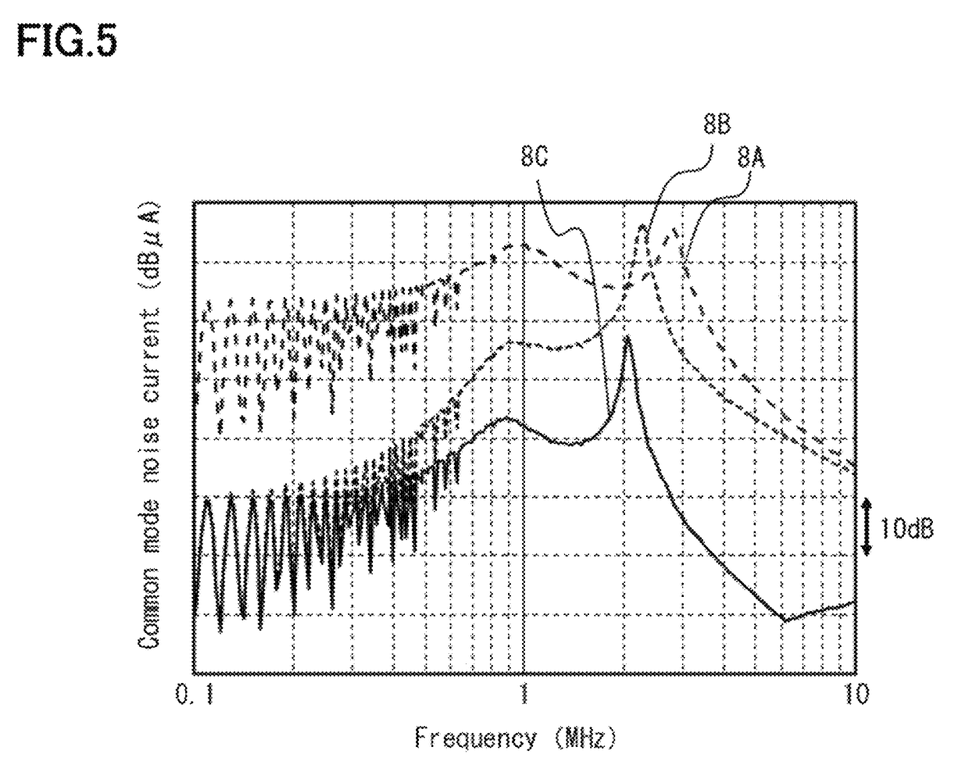
FIG. 5 is a characteristics diagram of common mode noise according to embodiment 1.

FIG. 5 is a characteristics diagram explaining an effect of reducing common mode noise in the rotary electric machine drive system according to the present embodiment. In FIG. 5, the horizontal axis indicates frequency, and the vertical axis indicates common mode noise current. It is noted that: FIG. 5 shows a result of analysis based on a simulation; and the common mode noise current takes the total value of currents flowing in the impedances to ground 71 and 72. A condition of the simulation for obtaining the result in FIG. 5 is as follows. That is, setting is made such that the capacitance component and the inductance component of the impedance to ground 71 of the first rotary electric machine 31 differ, by two times, from the capacitance component and the inductance component of the impedance to ground 72 of the second rotary electric machine 32 in the case where neither of the balance capacitor 8 and the balance inductor 9 are provided. In addition, setting is made such that the differences in the capacitance component and the inductance component between the impedance to ground 71 and the impedance to ground 72 are not completely 0 but are 1% by providing the balance capacitor 8 and the balance inductor 9.

In FIG. 5, a characteristics curve 8A is a result of analysis for comparison and indicates a common mode noise current in the case where neither of the balance capacitor 8 and the balance inductor 9 are provided. A characteristics curve 8B is also a result of analysis for comparison and indicates a common mode noise current in the case where only the balance capacitor 8 is provided. A characteristics curve 8C is a result of analysis regarding the configuration of the present embodiment and indicates a common mode noise current in the case where both the balance capacitor 8 and the balance inductor 9 are provided.

In the rotary electric machine drive system according to the present embodiment, as indicated by the characteristics curve 8C in FIG. 5, the common mode noise current is reduced in the frequency region in which the capacitance components of the impedances to ground 71 and 72 are dominant and in which the frequency is several MHz or lower, and the common mode noise current is reduced by at least 20 dB also in the frequency region in which the inductance components of the impedances to ground 71 and 72 are dominant and in which the frequency is several MHz or higher. Meanwhile, in the rotary electric machine drive system including only the balance capacitor 8, as indicated by the characteristics curve 8B in FIG. 5, the common mode noise current is reduced in the frequency region in which the capacitance components of the impedances to ground 71 and 72 are dominant and in which the frequency is several MHz or lower, but the effect of reducing the common mode noise current is low in the frequency region in which the inductance components of the impedances to ground 71 and 72 are dominant and in which the frequency is several MHz or higher.

As described above, the rotary electric machine drive system according to the present embodiment includes the balance capacitor and the balance inductor, for coincidence between: the impedance to ground generated between one of the rotary electric machines and the ground potential; and the impedance to ground generated between another one of the rotary electric machines and the ground potential. Thus, common mode noises can be reduced over a wide frequency region.

It is noted that, although an example in which the balance capacitor and the balance inductor are disposed in the second rotary electric machine has been described in the present embodiment, the balance capacitor and the balance inductor may be disposed in the first rotary electric machine or may be disposed in each of the rotary electric machines. Further, although a capacitor element is used as the balance capacitor 8 in the present embodiment, the balance capacitor 8 is not limited to a capacitor element and may be another element in which a capacitance component is dominant, such as a varistor, an arrester, or the like. Further, although an inductor element is used as the balance inductor 9 in the present embodiment, the balance inductor 9 is not limited to an inductor element and may be another part in which an inductance component is dominant, such as a cable, a busbar, or the like. Furthermore, although the balance capacitor and the balance inductor are connected in series in the present embodiment as shown in FIG. 1, the balance capacitor and the balance inductor may be connected in parallel. Moreover, the balance capacitor and the balance inductor may each be composed of a plurality of elements.

It is noted that, although each rotary electric machine has the Y connection in which the three windings are collectively connected at the neutral point in the present embodiment, the rotary electric machine may have a delta connection. Further, although the rotary electric machine group including the two rotary electric machines is driven by the drive device including the two inverters in the present embodiment, the number of sets of drive devices having the same configuration and rotary electric machine groups having the same configuration may be two or more.

Figure 6:
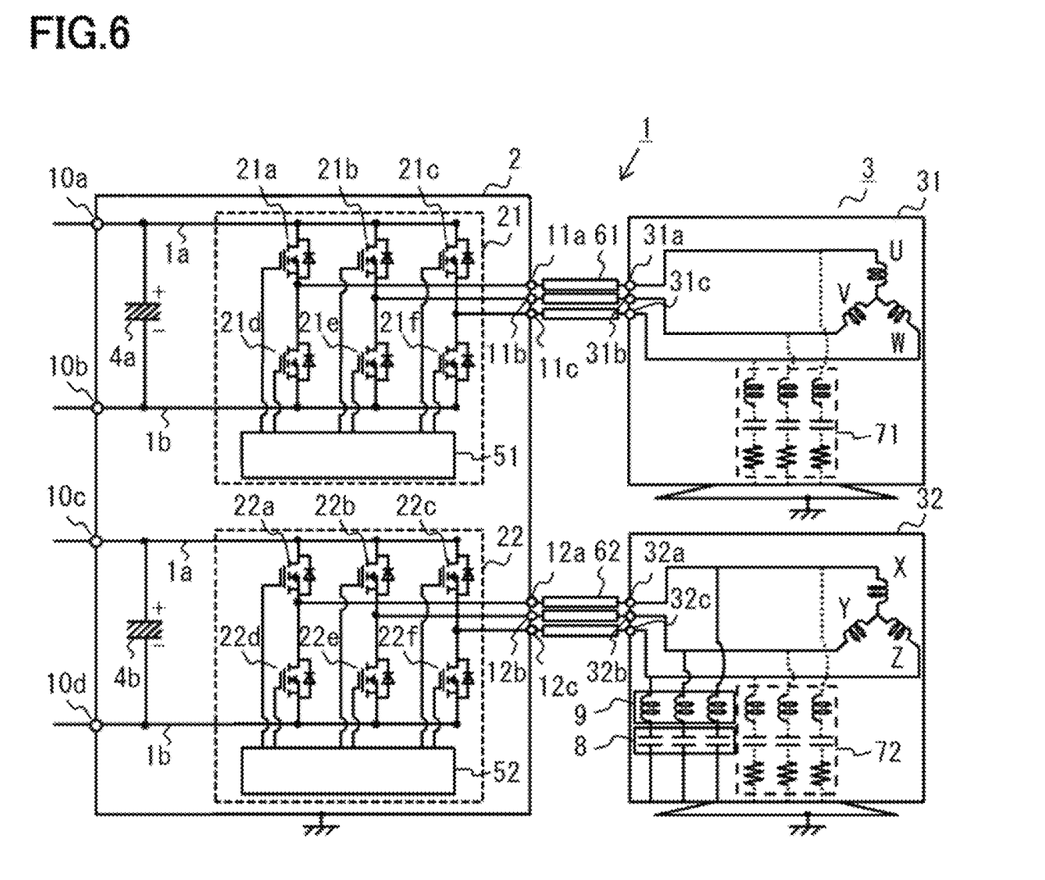
FIG. 6 is a circuit diagram of a rotary electric machine drive system according to embodiment 1.

It is noted that, although a pair of the positive electric path and the negative electric path extending from a pair of the input terminals each branch into two paths and the two paths are respectively connected to the input sides of the two inverters in the rotary electric machine drive system according to the present embodiment, two sets of input terminals respectively corresponding to the two inverters may be provided. FIG. 6 is a circuit diagram of another rotary electric machine drive system according to the present embodiment. As shown in FIG. 6, the other rotary electric machine drive system 1 according to the present embodiment includes: the positive input terminal 10a and the negative input terminal 10b corresponding to the first inverter 21; a positive input terminal 10c and a negative input terminal 10d corresponding to the second inverter 22; a smoothing capacitor 4a corresponding to the first inverter 21; and a smoothing capacitor 4b corresponding to the second inverter 22. Components other than these components are the same as those of the rotary electric machine drive system shown in FIG. 1.

The rotary electric machine drive system which is thus configured also includes the balance capacitor and the balance inductor, for coincidence between: the impedance to ground generated between the one of the rotary electric machines and the ground potential; and the impedance to ground generated between the other one of the rotary electric machines and the ground potential. Thus, common mode noises can be reduced over a wide frequency region.

Embodiment 2

Figure 7:
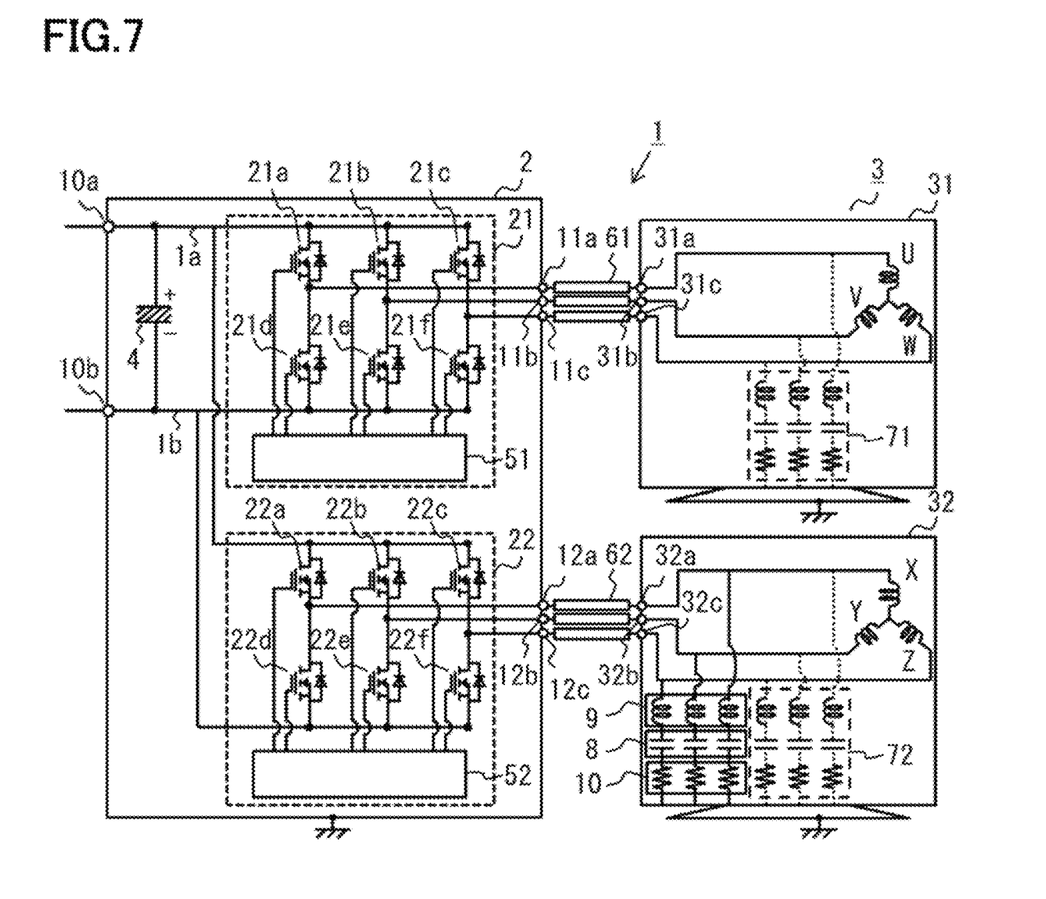
FIG. 7 is a circuit diagram of a rotary electric machine drive system according to embodiment 2.

FIG. 7 is a circuit diagram of a rotary electric machine drive system according to embodiment 2. The rotary electric machine drive system according to the present embodiment is obtained by further disposing a balance resistor in addition to the balance capacitor and the balance inductor in the rotary electric machine drive system described in embodiment 1.

As shown in FIG. 7, the rotary electric machine drive system according to the present embodiment has the same configuration as that of the rotary electric machine drive system described in embodiment 1, except that a balance resistor 10 is connected in series to the balance capacitor 8 and the balance inductor 9. The capacitance of the balance capacitor 8 is determined such that the capacitance component of the impedance to ground 71 of the first rotary electric machine 31 coincides with the capacitance component of the impedance to ground 72 of the second rotary electric machine 32. In addition, the inductance of the balance inductor 9 is determined such that the inductance component of the impedance to ground 71 of the first rotary electric machine 31 coincides with the inductance component of the impedance to ground 72 of the second rotary electric machine 32. Further, the resistance value of the balance resistor 10 is determined such that the resistance component of the impedance to ground 71 of the first rotary electric machine 31 coincides with the resistance component of the impedance to ground 72 of the second rotary electric machine 32. It is noted that, also in the rotary electric machine drive system according to the present embodiment, the carrier signal MB for the first inverter 21 and the carrier signal 52B for the second inverter 22 have the same frequency but are in mutually inverse phases in the same manner as in embodiment 1.

Figure 8:
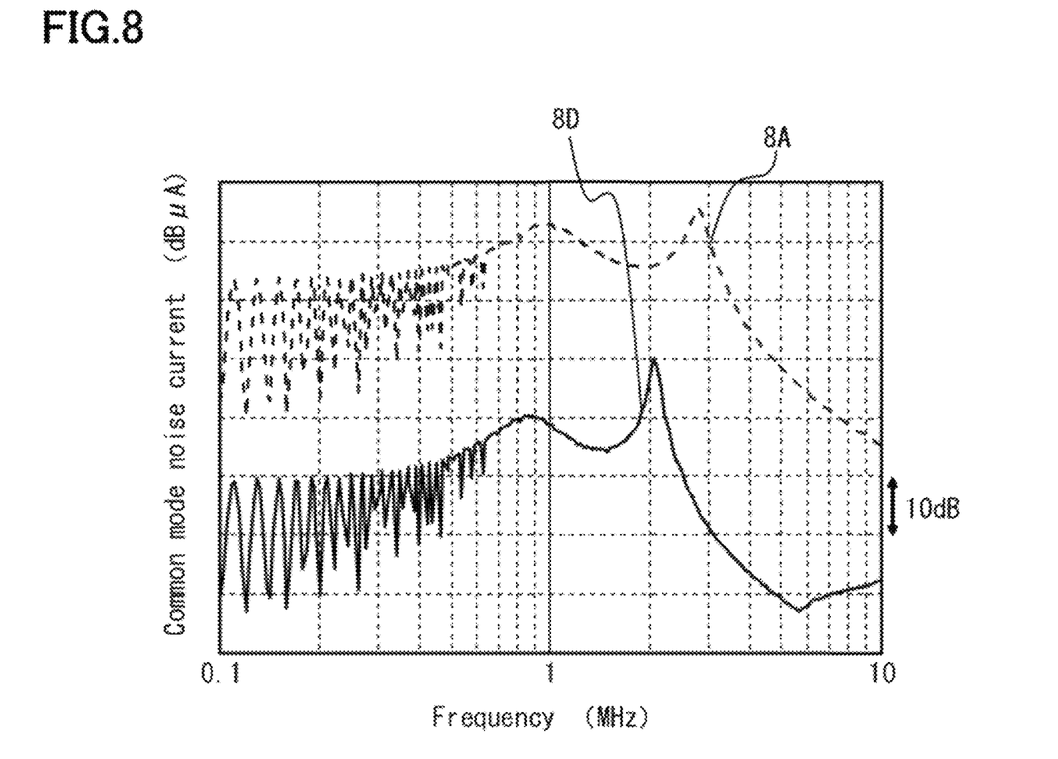
FIG. 8 is a characteristics diagram of common mode noise according to embodiment 2.

FIG. 8 is a characteristics diagram explaining an effect of reducing common mode noise in the rotary electric machine drive system according to the present embodiment. In FIG. 8, the horizontal axis indicates frequency, and the vertical axis indicates common mode noise current. It is noted that FIG. 8 shows a result of analysis based on a simulation in the same manner as in FIG. 5. A condition of the simulation for obtaining the result in FIG. 8 is as follows. That is, setting is made such that the capacitance component, the inductance component, and the resistance component of the impedance to ground 71 of the first rotary electric machine 31 differ, by two times, from the capacitance component, the inductance component, and the resistance component of the impedance to ground 72 of the second rotary electric machine 32 in the case where none of the balance capacitor 8, the balance inductor 9, and the balance resistor 10 are provided. In addition, setting is made such that the differences in the capacitance component, the inductance component, and the resistance component between the impedance to ground 71 and the impedance to ground 72 are not completely 0 but are 1% by providing the balance capacitor 8, the balance inductor 9, and the balance resistor 10.

In FIG. 8, the characteristics curve 8A is a result of analysis for comparison and indicates a common mode noise current in the case where none of the balance capacitor 8, the balance inductor 9, and the balance resistor 10 are provided. A characteristics curve 8D is a result of analysis regarding the configuration of the present embodiment and indicates a common mode noise current in the case where the balance capacitor 8, the balance inductor 9, and the balance resistor 10 are provided.

In the rotary electric machine drive system according to the present embodiment, as indicated by the characteristics curve 8D in FIG. 8, the common mode noise current is reduced in the frequency region in which the capacitance components of the impedances to ground 71 and 72 are dominant and in which the frequency is several MHz or lower, and the common mode noise current is reduced by at least 20 dB also in the frequency region in which the inductance components of the impedances to ground 71 and 72 are dominant and in which the frequency is several MHz or higher.

The rotary electric machine drive system according to the present embodiment further includes the balance resistor in addition to the balance capacitor and the balance inductor, for coincidence between: the impedance to ground generated between the one of the rotary electric machines and the ground potential; and the impedance to ground generated between the other one of the rotary electric machines and the ground potential. Thus, common mode noises can be reduced over a wide frequency region.

It is noted that, although an example in which the balance capacitor, the balance inductor, and the balance resistor are disposed in the second rotary electric machine has been described in the present embodiment, the balance capacitor, the balance inductor, and the balance resistor may be disposed in the first rotary electric machine or may be disposed in each of the rotary electric machines. Further, although the balance capacitor, the balance inductor, and the balance resistor are connected in series in the present embodiment as shown in FIG. 8, the balance capacitor, the balance inductor, and the balance resistor may be connected in parallel. Moreover, the balance capacitor and the balance inductor may each be composed of a plurality of elements.

Embodiment 3

Figure 9:
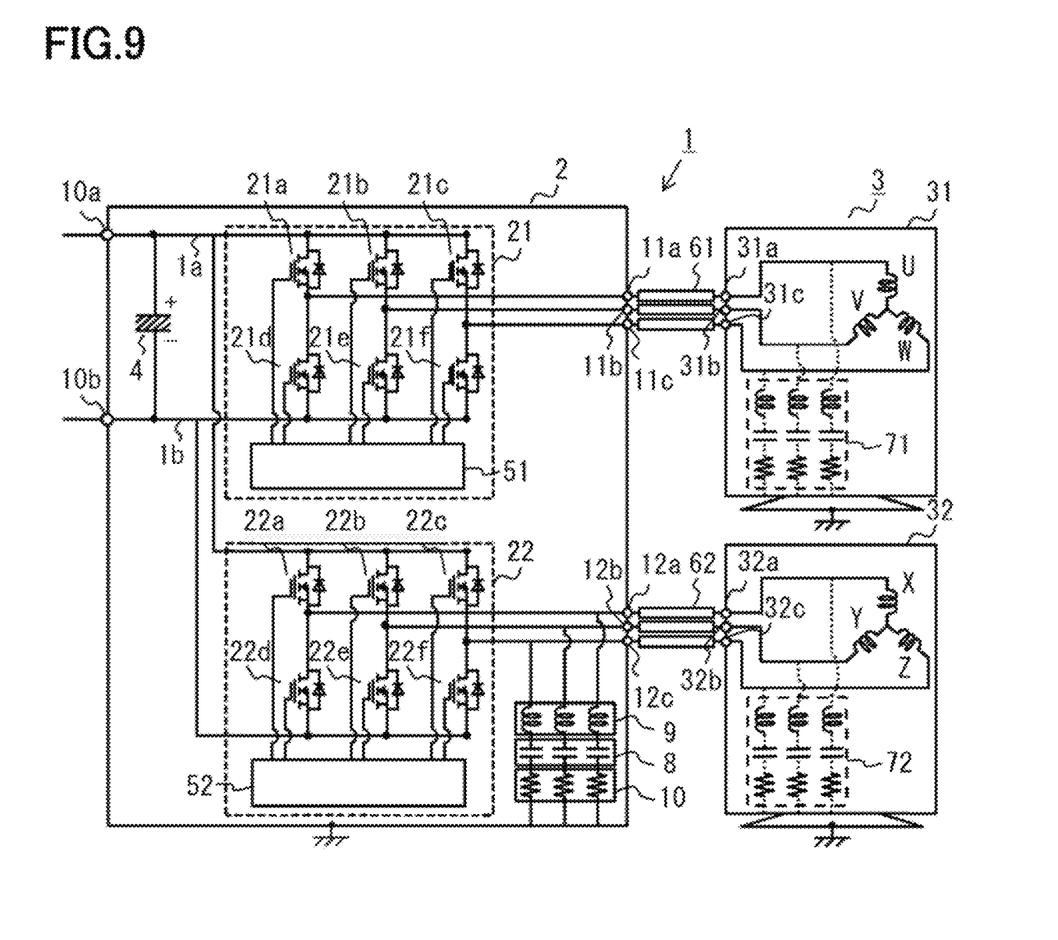
FIG. 9 is a circuit diagram of a rotary electric machine drive system according to embodiment 3.

FIG. 9 is a circuit diagram of a rotary electric machine drive system according to embodiment 3. The rotary electric machine drive system according to the present embodiment is obtained by providing the balance capacitor, the balance inductor, and the balance resistor not to the rotary electric machine but to the drive device in the rotary electric machine drive system described in embodiment 2.

As shown in FIG. 9, the rotary electric machine drive system according to the present embodiment has the same configuration as that of the rotary electric machine drive system described in embodiment 2, except that the balance capacitor 8, the balance inductor 9, and the balance resistor 10 are connected between the ground potential and each of the three output terminals 12a, 12b, and 12c of the second inverter 22. In this configuration, the balance capacitor 8, the balance inductor 9, and the balance resistor 10 have functions of reducing the difference between the impedance of a connection portion 61 and the impedance of a connection portion 62 in addition to the functions of reducing the difference between the impedance to ground 71 and the impedance to ground 72. The capacitance of the balance capacitor 8 is determined such that the capacitance component of the impedance to ground 71 of the first rotary electric machine 31 and a capacitance component of the impedance of the connection portion 61 respectively coincide with the capacitance component of the impedance to ground 72 of the second rotary electric machine 32 and a capacitance component of the impedance of the connection portion 62. In addition, the inductance of the balance inductor 9 is determined such that the inductance component of the impedance to ground 71 of the first rotary electric machine 31 and an inductance component of the impedance of the connection portion 61 respectively coincide with the inductance component of the impedance to ground 72 of the second rotary electric machine 32 and an inductance component of the impedance of the connection portion 62. Further, the resistance value of the balance resistor 10 is determined such that the resistance component of the impedance to ground 71 of the first rotary electric machine 31 and a resistance component of the impedance of the connection portion 61 respectively coincide with the resistance component of the impedance to ground 72 of the second rotary electric machine 32 and a resistance component of the impedance of the connection portion 62. It is noted that, also in the rotary electric machine drive system according to the present embodiment, the carrier signal 51B for the first inverter 21 and the carrier signal 52B for the second inverter 22 have the same frequency but are in mutually inverse phases in the same manner as in embodiment 1.

The rotary electric machine drive system which is thus configured includes, in the same manner as in embodiment 2, the balance capacitor, the balance inductor, and the balance resistor for coincidence between: the impedance to ground generated between the one of the rotary electric machines and the ground potential; and the impedance to ground generated between the other one of the rotary electric machines and the ground potential. Thus, common mode noises can be reduced over a wide frequency region.

It is noted that, although an example in which the balance capacitor, the balance inductor, and the balance resistor are disposed between the ground potential and the output terminal of the second inverter has been described in the present embodiment, the balance capacitor, the balance inductor, and the balance resistor may be disposed between the ground potential and the output terminal of the first inverter or may be disposed between the ground potential and the output terminal of each of the inverters. Further, the balance capacitor, the balance inductor, and the balance resistor may be disposed between the ground potential and at least one of the connection line 61 and the connection line 62 which respectively connect the drive device 2 to the first rotary electric machine 31 and the second rotary electric machine 32.

It is noted that, although the rotary electric machine drive system according to the present embodiment includes the balance capacitor, the balance inductor, and the balance resistor, the balance resistor may not be provided if the resistance component of each impedance to ground is low. Further, although the balance capacitor, the balance inductor, and the balance resistor are connected in series in the present embodiment as shown in FIG. 9, the balance capacitor, the balance inductor, and the balance resistor may be connected in parallel. Moreover, the balance capacitor and the balance inductor may each be composed of a plurality of elements.

Embodiment 4

Figure 10:
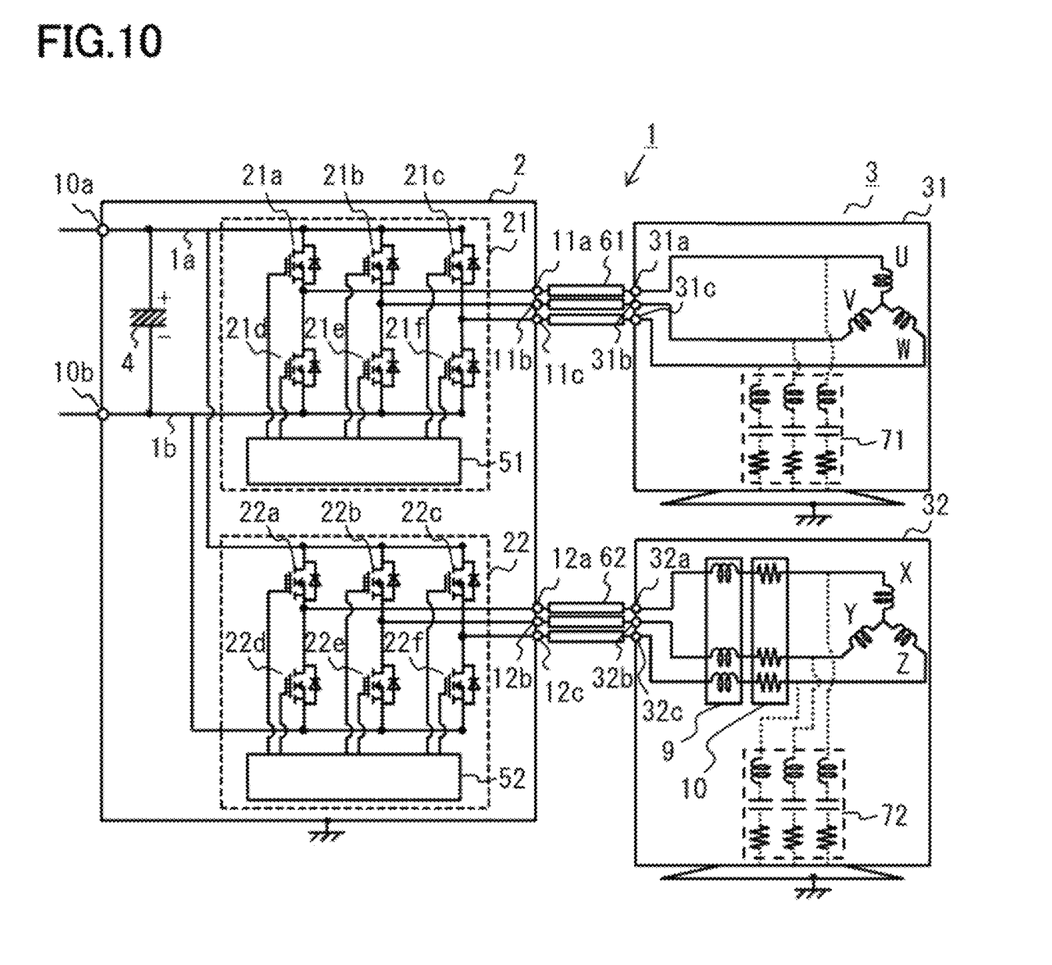
FIG. 10 is a circuit diagram of a rotary electric machine drive system according to embodiment 4.

FIG. 10 is a circuit diagram of a rotary electric machine drive system according to embodiment 4. The rotary electric machine drive system according to the present embodiment is obtained by eliminating the balance capacitor so as to include only the balance inductor 9 and the balance resistor 10 in the rotary electric machine drive system described in embodiment 2. Meanwhile, the connection location between the balance inductor 9 and the balance resistor 10 is different from that in the rotary electric machine drive system according to embodiment 2. In the present embodiment, a rotary electric machine has the function of the balance capacitor.

It is known that, out of a capacitance component of an impedance to ground of a rotary electric machine, a stray capacitance generated between a winding and a stator of the rotary electric machine is dominant. An insulating member is inserted between the winding and the stator, and the value of the stray capacitance can be adjusted by adjusting the thickness of the insulating member or the permittivity of the insulating member.

Figure 11:
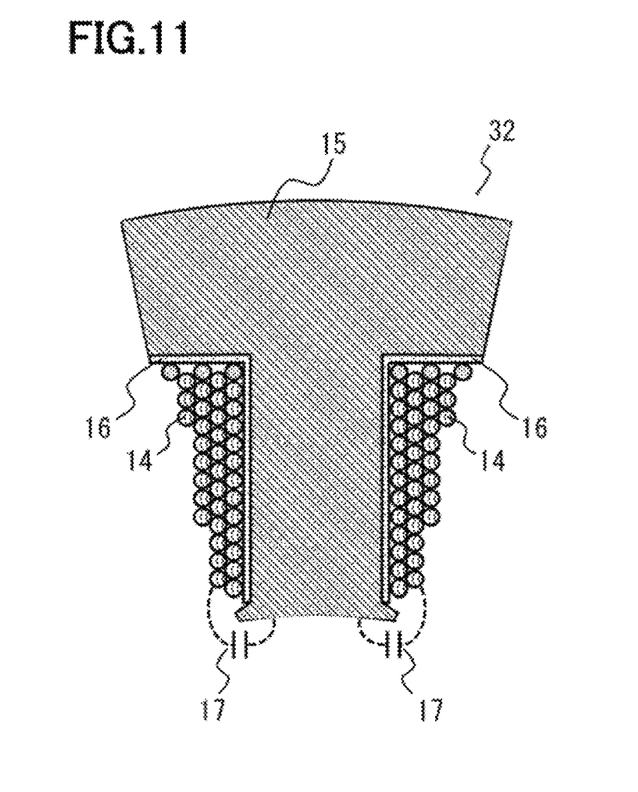
FIG. 11 is a schematic cross-sectional view of a rotary electric machine according to embodiment 4.

FIG. 11 is a schematic cross-sectional view of a rotary electric machine according to the present embodiment and shows a cross section of one slot of the second rotary electric machine 32. A winding 14 of the second rotary electric machine 32 is wound on a stator 15, and an insulating member 16 is inserted between the winding 14 and the stator 15. The winding 14 is, for example, a copper wire or the like. The stator 15 is made of, for example, stacked electromagnetic steel sheets or the like. The insulating member 16 is, for example, an insulation paper sheet obtained by stacking an insulative resin on a polyester film, or the like. As shown in FIG. 11, a stray capacitance 17 generated between the winding and the stator is determined according to the thickness and the permittivity of the insulating member 16. Therefore, the thickness of the insulating member 16 of the second rotary electric machine 32 or the permittivity of the insulating member 16 is adjusted so that the stray capacitance 17 generated between the winding 14 and the stator 15 of the second rotary electric machine 32 can be set to coincide with a stray capacitance generated between a winding and a stator of the first rotary electric machine 31.

In the case of using the second rotary electric machine 32 in which the adjustment is thus made, the function of the balance capacitor described in embodiment 1 can be achieved by the second rotary electric machine 32. As a result, the rotary electric machine drive system according to the present embodiment includes, as shown in FIG. 10, only the balance inductor 9 and the balance resistor 10 by eliminating the balance capacitor. Meanwhile, in the present embodiment, the balance inductor 9 and the balance resistor 10 are connected not in parallel, but in series, to the impedance to ground 72. Specifically, the balance inductor 9 and the balance resistor 10 are connected between each of the input terminals 32a, 32b, and 32c of the second rotary electric machine 32 and a corresponding one of the X phase winding, the Y phase winding, and the Z phase winding. It is noted that, also in the rotary electric machine drive system according to the present embodiment, the carrier signal 51B for the first inverter 21 and the carrier signal 52B for the second inverter 22 have the same frequency but are in mutually inverse phases in the same manner as in embodiment 1.

In the rotary electric machine drive system which is thus configured, common mode noises can be reduced over a wide frequency region in the same manner as in embodiment 2.

It is noted that, although the balance inductor 9 and the balance resistor 10 are connected between each of the input terminals 32a, 32b, and 32c of the second rotary electric machine 32 and the corresponding one of the X phase winding, the Y phase winding, and the Z phase winding in the rotary electric machine drive system according to the present embodiment, the balance inductor 9 and the balance resistor 10 may be connected between the second inverter 22 and each of the three output terminals 12a, 12b, and 12c of the drive device 2.

Embodiment 5

Figure 12:
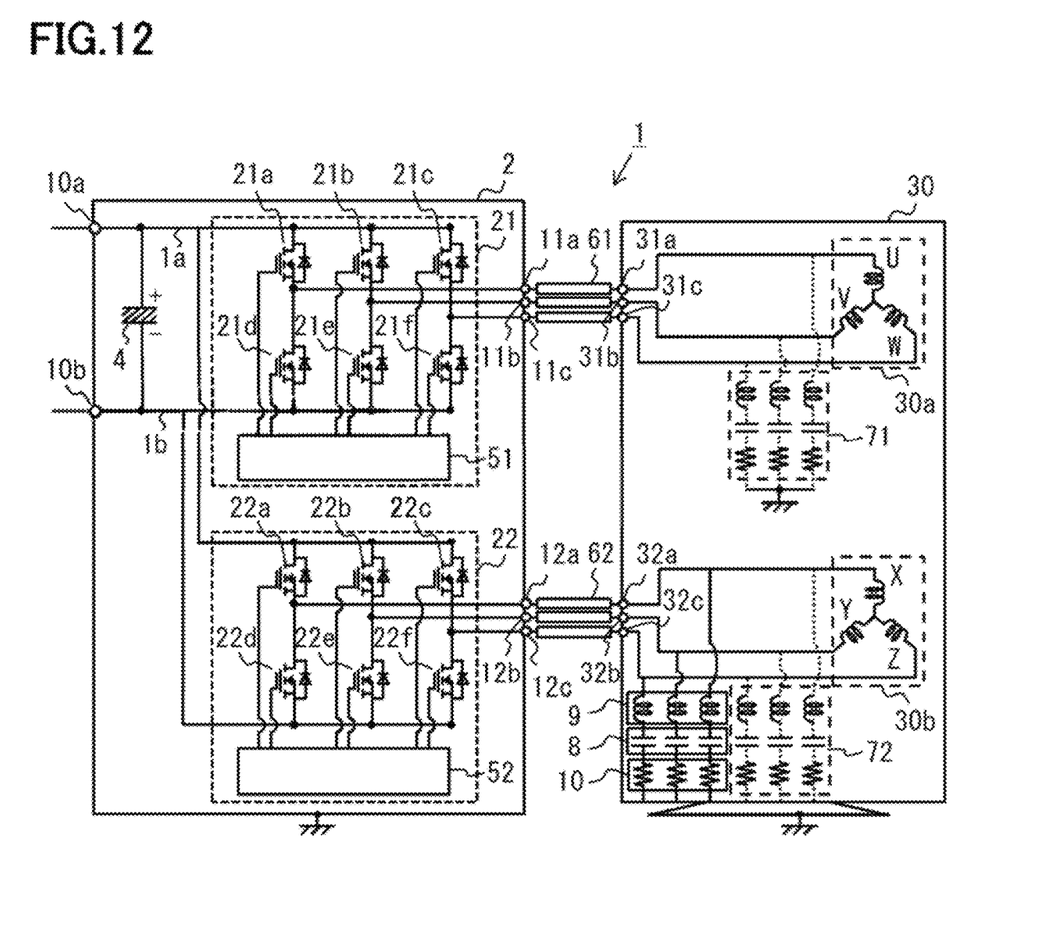
FIG. 12 is a circuit diagram of a rotary electric machine drive system according to embodiment 5.

FIG. 12 is a circuit diagram of a rotary electric machine drive system according to embodiment 5. In the rotary electric machine drive system according to the present embodiment, the rotary electric machines are replaced with one rotary electric machine having a structure with two groups of three-phase windings.

As shown in FIG. 12, in the rotary electric machine drive system 1 according to the present embodiment, the drive device 2 is the same as that in embodiment 1, but the rotary electric machines are replaced with one rotary electric machine 30 having a structure with two groups of three-phase windings. The rotary electric machine 30 includes: a winding group 30a formed by three-phase windings, i.e., a U phase winding, a V phase winding, and a W phase winding; and a winding group 30b formed by three-phase windings, i.e., an X phase winding, a Y phase winding, and a Z phase winding.

The three input terminals 31a, 31b, and 31c of the rotary electric machine 30 are respectively connected to the U phase winding, the V phase winding, and the W phase winding. In addition, the other three input terminals 32a, 32b, and 32c of the rotary electric machine 30 are respectively connected to the X phase winding, the Y phase winding, and the Z phase winding. The impedance to ground 71 is formed between the ground potential and the input terminals 31a, 31b, and 31c of the rotary electric machine 30. Similarly, the impedance to ground 72 is formed between the ground potential and the other input terminals 32a, 32b, and 32c.

The balance capacitor 8, the balance inductor 9, and the balance resistor 10 are disposed between the ground potential and each of the input terminals 32a, 32b, and 32c of the rotary electric machine 30. The balance capacitor 8, the balance inductor 9, and the balance resistor 10 are provided for adjusting the impedance to ground of the winding group 30b such that the impedance to ground 71 of the winding group 30a coincides with the impedance to ground 72 of the winding group 30b. It is noted that, also in the rotary electric machine drive system according to the present embodiment, the carrier signal 51B for the first inverter 21 and the carrier signal 52B for the second inverter 22 have the same frequency but are in mutually inverse phases in the same manner as in embodiment 1.

In the rotary electric machine drive system which is thus configured, common mode noises can be reduced over a wide frequency region in the same manner as in embodiment 2.

Although the disclosure is described above in terms of various exemplary embodiments, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent parts may be modified, added, or eliminated. At least one of the constituent parts mentioned in at least one of the preferred embodiments may be selected and combined with the constituent parts mentioned in another preferred embodiment.

DESCRIPTION OF THE REFERENCE CHARACTERS 1 drive system
1a positive electric path
1b negative electric path
2 drive device
3 rotary electric machine group
8 balance capacitor
9 balance inductor
10 balance resistor
11a, 11b, 11c, 12a, 12b, 12c output terminal
14 winding
15 stator
16 insulating member
17 stray capacitance
21 first inverter
22 second inverter
30a, 30b winding group
31 first rotary electric machine
32 second rotary electric machine
30 rotary electric machine
31a, 31b, 31c, 32a, 32b, 32c input terminal
51, 52 control unit
71, 72 impedance to ground

The invention claimed is:

1. A rotary electric machine drive device configured to drive two rotary electric machines, the drive device comprising a first inverter and a second inverter configured to respectively drive the two rotary electric machines, wherein
a carrier signal for controlling the first inverter and a carrier signal for controlling the second inverter are set to be in mutually opposite phases, and
for at least one inverter out of the first inverter and the second inverter, a balance capacitor and a balance inductor are disposed between an output terminal of the at least one inverter and a ground potential such that an impedance to ground generated between one of the rotary electric machines and the ground potential coincides with an impedance to ground generated between another one of the rotary electric machines and the ground potential.

2. The rotary electric machine drive device according to claim 1, wherein a balance resistor is further disposed in addition to the balance capacitor and the balance inductor.

3. A rotary electric machine drive system comprising:
two rotary electric machines; and
a drive device configured to drive the two rotary electric machines, wherein
the drive device includes a first inverter and a second inverter configured to respectively drive the two rotary electric machines,
a carrier signal for controlling the first inverter and a carrier signal for controlling the second inverter are set to be in mutually opposite phases, and
for at least one connection line out of a connection line between the first inverter and one of the rotary electric machines and a connection line between the second inverter and another one of the rotary electric machines, a balance capacitor and a balance inductor are disposed between the at least one connection line and a ground potential such that an impedance to ground generated between the one of the rotary electric machines and the ground potential coincides with an impedance to ground generated between the other one of the rotary electric machines and the ground potential.

4. The rotary electric machine drive system according to claim 3, wherein a balance resistor is further disposed in addition to the balance capacitor and the balance inductor.

5. A rotary electric machine, wherein a balance capacitor and a balance inductor are disposed between an input terminal and a ground potential such that an impedance to ground generated between the input terminal and the ground potential coincides with an impedance to ground of another rotary electric machine to be driven together with the rotary electric machine.

6. The rotary electric machine according to claim 5, wherein a balance resistor is further disposed in addition to the balance capacitor and the balance inductor.

7. The rotary electric machine according to claim 5, wherein
at least one of a thickness of an insulating member disposed between a winding and a stator and a permittivity of the insulating member is adjusted such that a stray capacitance generated between an input terminal and a ground potential coincides with a stray capacitance of another rotary electric machine to be driven together with the rotary electric machine.

* * * * *